United States Patent [19]

Unger

[11] Patent Number: 5,036,788
[45] Date of Patent: Aug. 6, 1991

[54] BOAT TRANSOM CONSTRUCTION AND METHOD OF MAKING SAME

[76] Inventor: Wolfgang Unger, 1426 Beacon St., New Smyrna Beach, Fla. 32069

[21] Appl. No.: 306,640

[22] Filed: Feb. 6, 1989

Related U.S. Application Data

[63] Continuation-in-part of Ser. No. 114,210, Oct. 28, 1987, abandoned.

[51] Int. Cl.$^5$ ............................................. B63B 3/70
[52] U.S. Cl. .................................... 114/355; 114/357; 156/245
[58] Field of Search ....................... 114/355, 357, 356; 428/60, 273; 156/245

[56] References Cited

U.S. PATENT DOCUMENTS

| | | | |
|---|---|---|---|
| 2,866,985 | 1/1959 | Blackmore | 114/357 |
| 3,007,208 | 11/1961 | Urban | 114/355 |
| 3,103,018 | 9/1963 | Eldred | 114/357 |
| 3,998,763 | 12/1976 | Bohnel | 428/273 |
| 4,303,707 | 12/1981 | Prior | 428/60 |

Primary Examiner—Sherman D. Basinger
Assistant Examiner—Thomas J. Brahan
Attorney, Agent, or Firm—Edward W. Osann, Jr.

[57] ABSTRACT

A boat transom and method of constructing same utilizing the outer skin of the hull and transom while still in the hull mold. A bulkhead is disposed in forwardly spaced relation to the outer skin of the transom and the space therebetween is filled with high tensile strength synthetic resin which may be of the polyester type blended with a suitable hardener. The resin includes entrained microspheres evenly dispersed throughout the transom body and ground fiberglass reinforced plastic scrap. The transom body is cast in a series of merging layers containing fiberglass reinforcing which extends in zig zag fashion from edge to edge of the transom body cavity and additional strands which extend in a skewed pattern. The bulkhead may be removed after the casting operation or may be allowed to remain in place. A further aspect of the invention involves the casting of a fiberglass reinforced synthetic resin transom body in a generally horizontal mold, or an upright mold, separate from the hull mold.

12 Claims, 5 Drawing Sheets

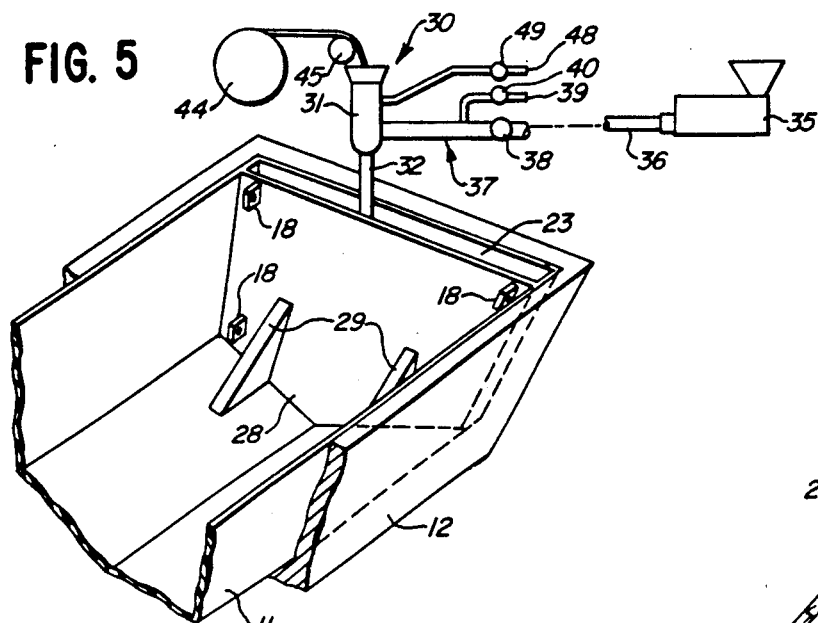
FIG. 5
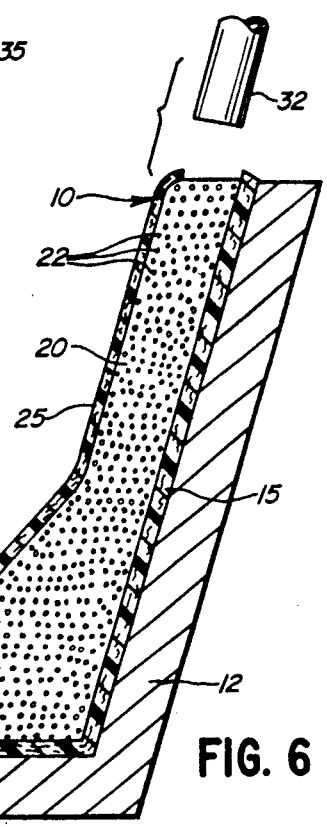
FIG. 6
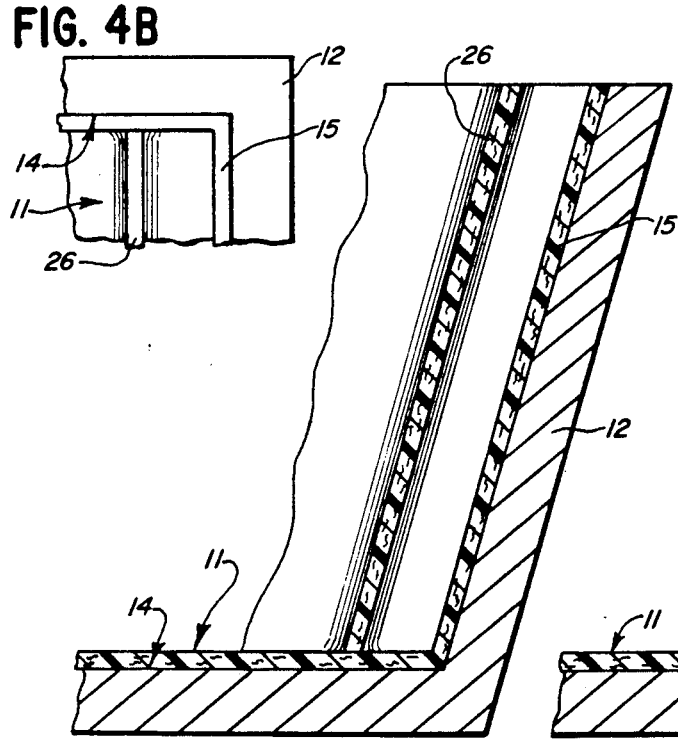
FIG. 4B
FIG. 4A
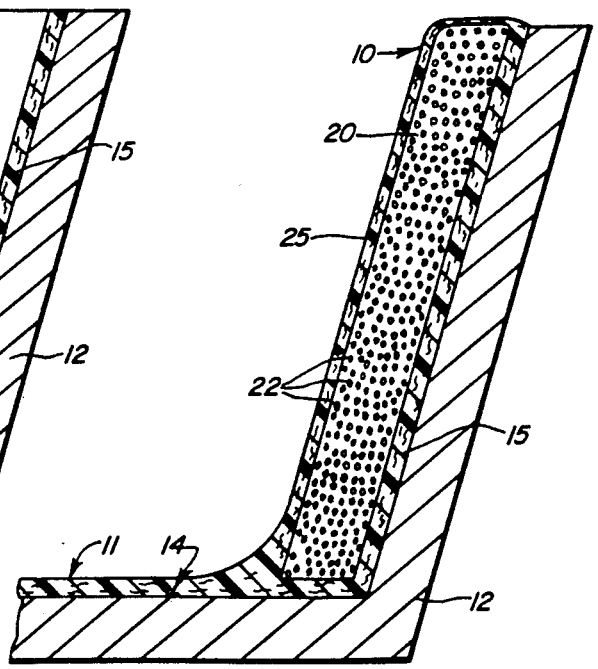
FIG. 4

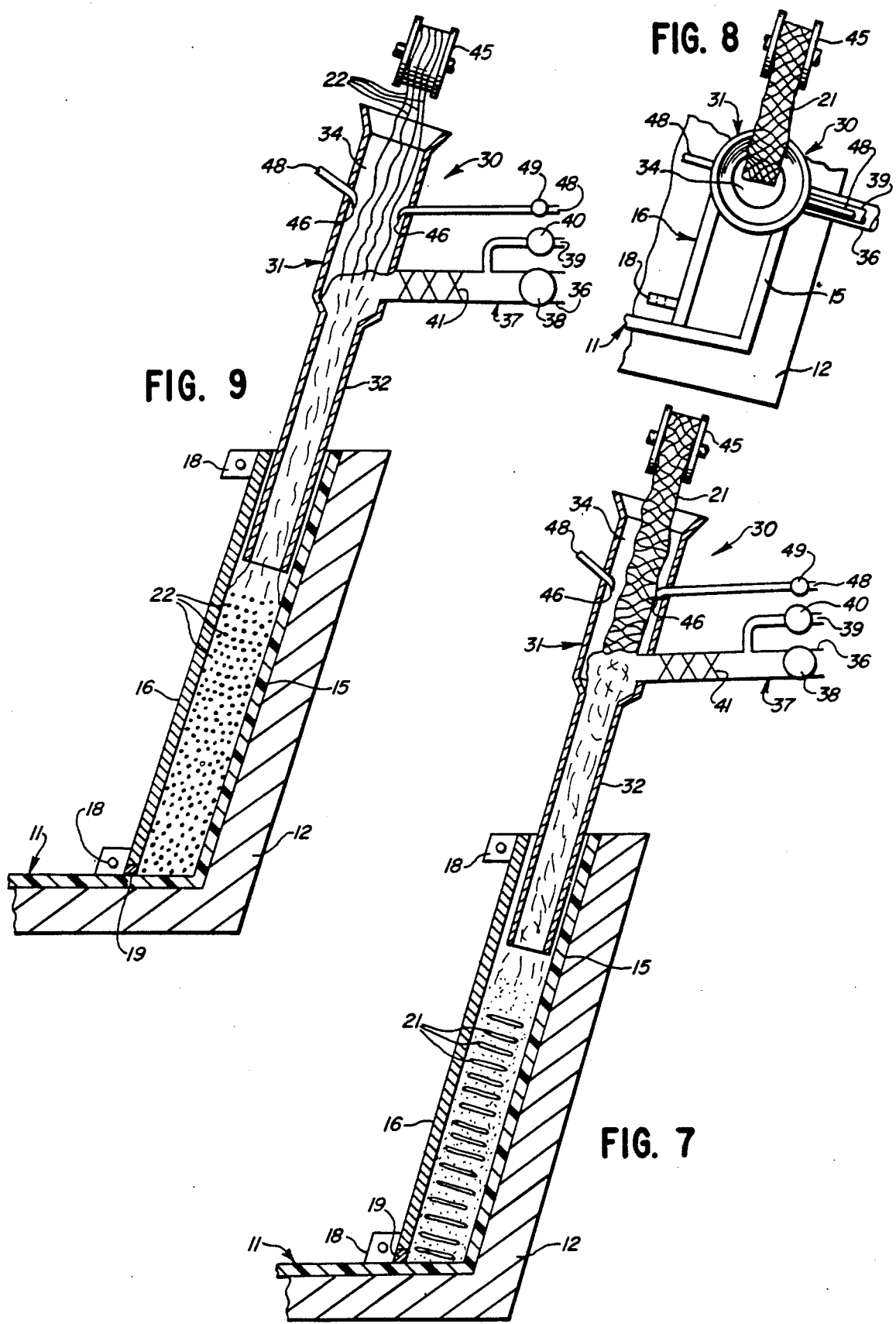

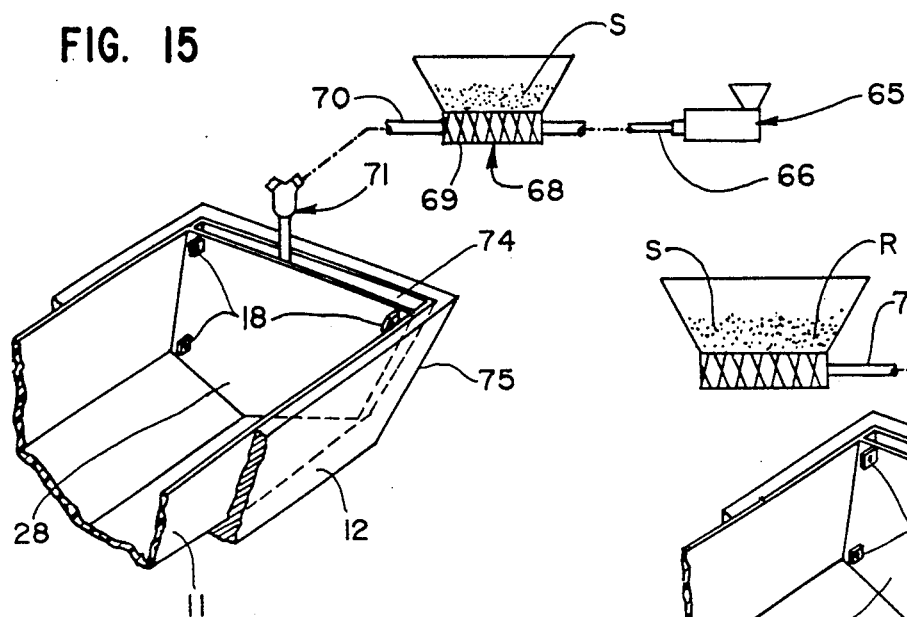
FIG. 15
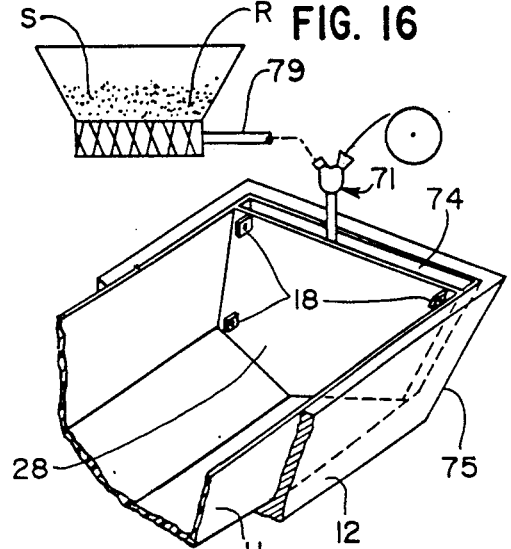
FIG. 16
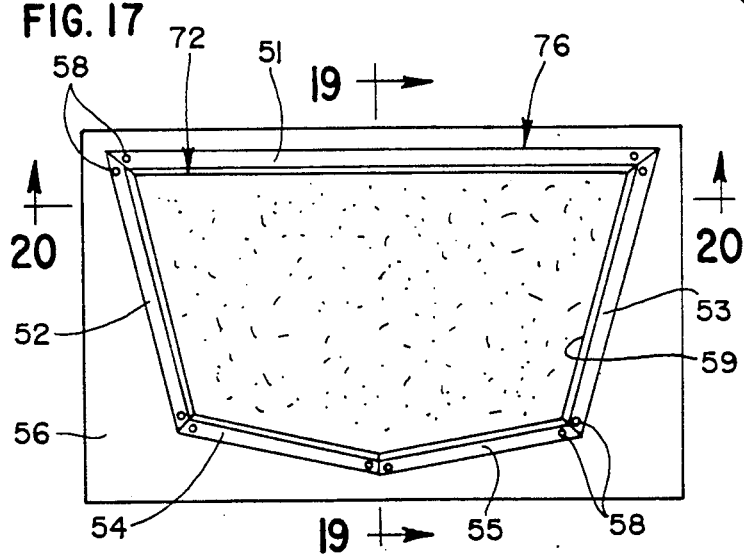
FIG. 17
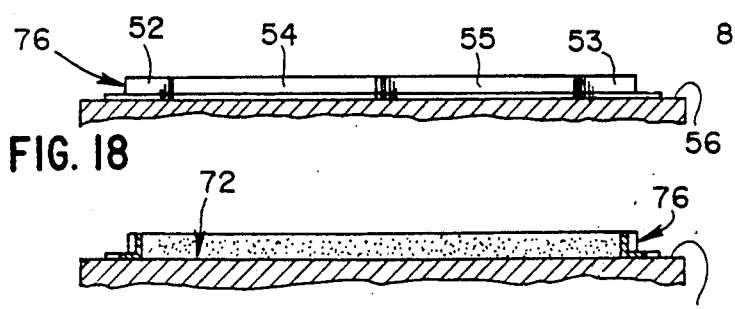
FIG. 18
FIG. 20
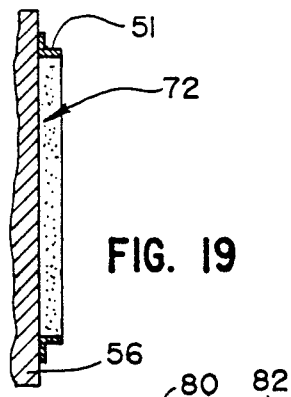
FIG. 19
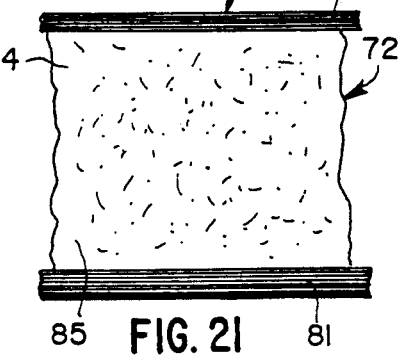
FIG. 21

BOAT TRANSOM CONSTRUCTION AND METHOD OF MAKING SAME

This application is a continuation-in-part of my prior copending application, Ser. No. 07/114,210 filed Oct. 28, 1987, now abandoned.

BACKGROUND OF THE INVENTION

The present invention relates to the fabrication of boat hulls from various synthetic resin materials and, more specifically, to a novel method and apparatus for fabricating high strength boat transoms. Most contemporary boat hulls, measuring from a few feet up to 100 feet or more in length, are fabricated from some form of fiberglas reinforced polyester resin. It is still a widespread practice in the industry, however, to fabricate the transom out of marine or exterior grade plywood with layers of fiberglas and resin on each face. After comparatively few years of usage, small leaks develop in the plastic skin and fastener holes, causing water to be soaked up by the plywood core. This leads to delamination and ultimately rotting of the plywood, with consequent failure of the transom. The problem is particularly acute in boats where large high-powered outboard, or inboard-outboard, motors are mounted on or through the transom.

SUMMARY OF THE INVENTION

One object of the present invention is to provide a novel boat transom construction and method of making same which is far superior to a conventional marine plywood transom from the standpoint of strength and durability.

Another object of the invention is to provide a boat transom of the character set forth above and a method for making same, giving the transom excellent resistance to impact loads.

A further object of the invention is to provide a boat transom and method of constructing same, giving the transom excellent resistance to torsion loads generated by an outboard, or inboard-outboard, motor.

Still another object of the invention is to provide a boat transom of the character set forth above having greater strength and durability at substantially lower cost than transoms of the type known heretofore.

Other objects and advantages of the invention will become apparent as the following description proceeds, taken with the accompanying drawings.

The foregoing objects are accomplished by taking advantage of the outer skin of the hull and transom while still in the hull mold; providing a temporary bulkhead spaced forward of the outer skin of the transom by the desired thickness of the transom body; filling the transom body cavity between the outer skin and the bulkhead with synthetic resin containing a catalyst or hardener and microspheres of glass or other material to minimize weight, and laying down the transom body in a series of layers of the resin containing fiberglas reinforcing which extends in zig zag fashion from side edge to side edge of the transom cavity until the latter is completely filled. The above objects are also accomplished by casting a fiberglas reinforced synthetic resin transom body in a generally horizontal mold, or an upright mold, separate from the hull mold.

BRIEF DESCRIPTION OF THE DRAWINGS

FIG. 4 is an enlarged, fragmentary, transverse sectional view showing the transom of FIG. 2 after it has been completed.

FIGS. 4A and 4B illustrate a modified method of fabricating the transom in a hull mold utilizing a relatively heavy fibergl bulkhead spaced forwardly from the outer fiberglas skin and rigidly connected thereto by fiberglas filets.

FIG. 5 is an enlarged, fragmentary perspective view of the stern portion of a boat in the hull mold having a transom being formed with reinforcing gussets cast integrally therewith.

FIG. 6 is an enlarged, fragmentary, transverse sectional view through the completed transom with gussets as formed in FIG. 5.

FIG. 7 is an enlarged, fragmentary, vertical sectional view through an apparatus for fabricating a boat transom utilizing fiberglas tape in accordance with the novel method described herein.

FIG. 8 is a fragmentary plan view of the apparatus as shown in FIG. 7.

FIG. 9 is a view similar to FIG. 7 but showing the use of fiberglas roving in constructing the transom instead of fiberglas tape.

FIG. 15 is a fragmentary perspective view of the stern portion of a boat in a hull mold having a transom body being cast from a mixture of synthetic resin and fiberglas reinforced plastic scrap supplied by two units in series.

FIG. 16 is a view similar to FIG. 15 wherein the synthetic resin and fiberglas reinforced plastic scrap are supplied by a single unit.

FIG. 17 is a plan view of a horizontal open faced mold for casting a transom body from fiberglas reinforced plastic scrap and synthetic resin separately from the hull mold.

FIG. 18 is an elevational view of the mold shown in FIG. 17.

FIGS. 19 and 20 are vertical and horizontal sectional views, respectively, through the mold and transom body therein.

FIG. 21 is an enlarged fragmentary, horizontal sectional view through a completed transom made from fiberglas reinforced plastic scrap and synthetic resin.

DETAILED DESCRIPTION OF THE INVENTION

Figure 1:
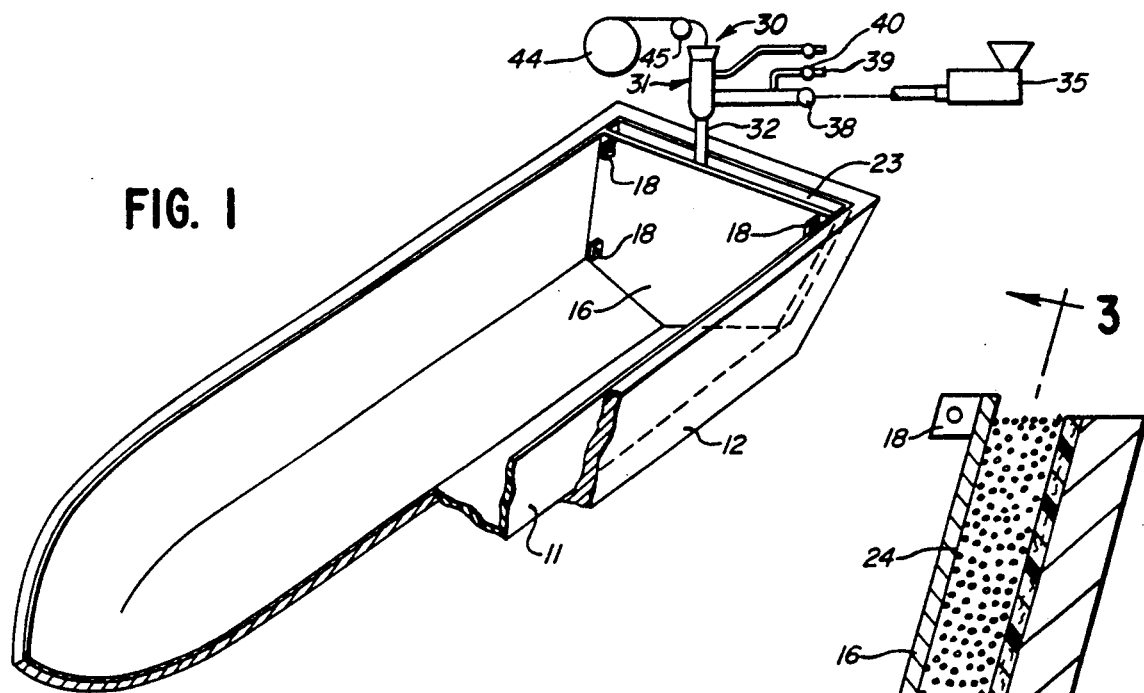
FIG. 1 is a fragmentary perspective view of a boat hull and transom embodying the present invention under construction in a hull mold.
Figure 2:
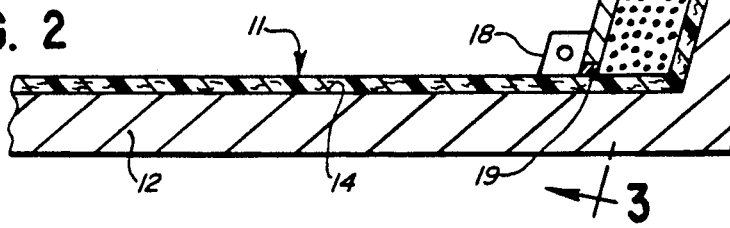
FIG. 2 is an enlarged, fragmentary, transverse sectional view of the transom forms in position for receiving the fiberglas reinforced resin material, taken in the plane of the line 2—2 in FIG. 3.

Referring more specifically to FIGS. 1-9, the invention is there exemplified in a novel boat transom 10 and method for fabricating same whereby the transom will have exceptionally high strength and great impact resistance. The initial step in constructing such a transom starts with the build-up of a fiberglas reinforced outer skin 11 in a hull mold 12 having a cavity 14 which defines the outer configuration of the hull, including the outer fiberglas skin 15 of the transom. A temporary bulkhead 16 is mounted in spaced relation to the outer skin 15 of the transom so as to define a space of the desired thickness for the transom body (FIGS. 1, 2, 5, 7-9). The temporary bulkhead 16 is fashioned with pairs of engagement lugs 18 rigidly connected in any suitable manner to the hull mold. The bulkhead 16 has a seal 19 between the fiberglas outer skin 11 and the bottom edge of the bulkhead. The seal may also be extended along the side edges of the bulkhead.

Figure 3:
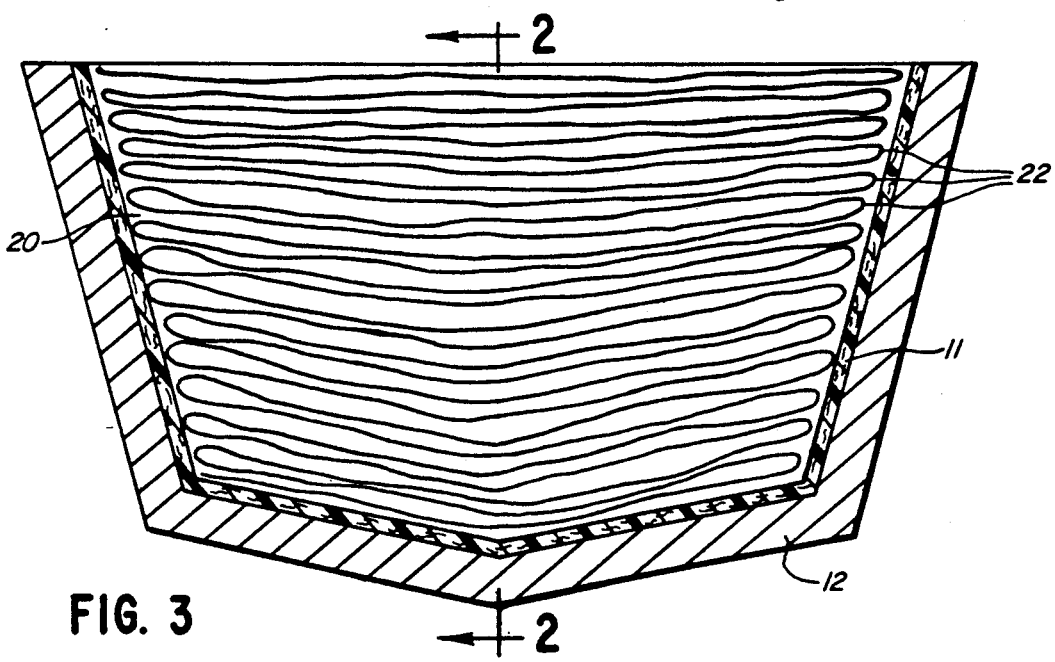
FIG. 3 is a vertical sectional view taken in the medial plane 3—3 of the transom upon completion of the casting operation.
Figure 11:
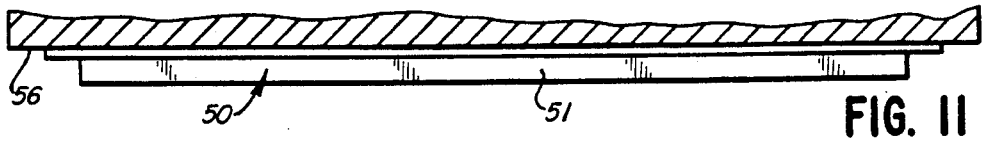
FIG. 11 is an elevational view of the wider side of the mold shown in FIG. 10 resting upon an underlying supporting surface.
Figure 10:
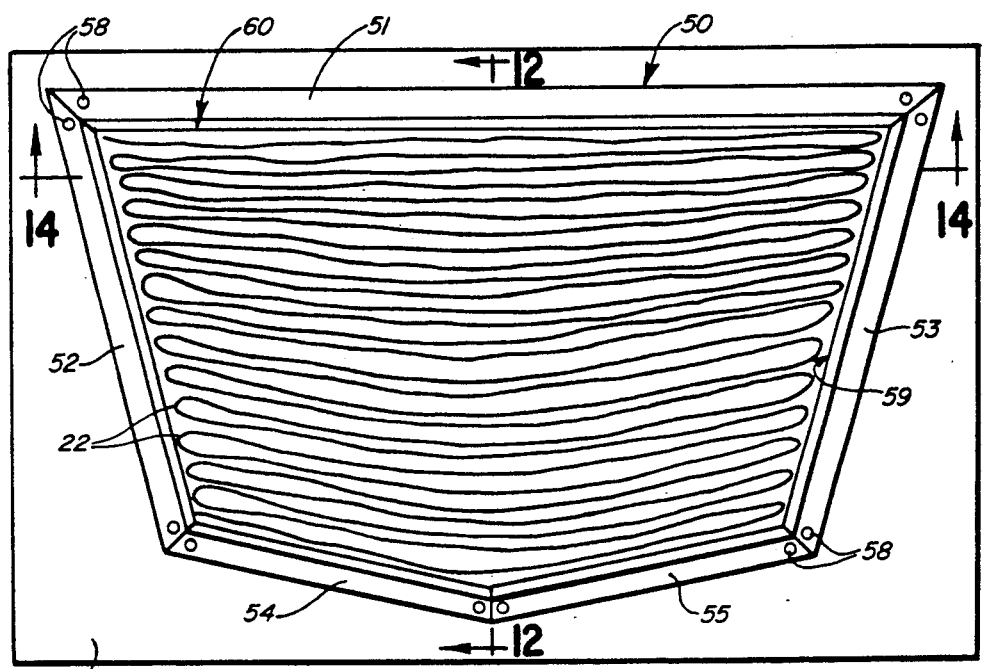
FIG. 10 is a plan view illustrating a variant of the method described earlier herein and utilizing a peripheral open faced mold supported on a table or other flat supporting surface.
Figure 12:
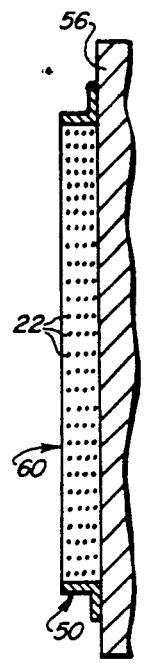
FIG. 12 is a vertical sectional view through the mold and cast transom in the plane of the line 12—12 in FIG. 10 showing the fiberglas roving used for reinforcement.
Figure 13:
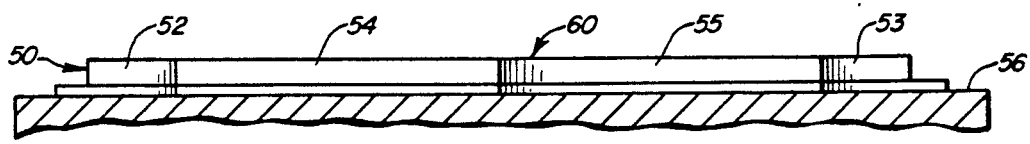
FIG. 13 is an elevational view showing the V-shaped side of the mold opposite to the wider side shown in FIG. 11.
Figure 14:
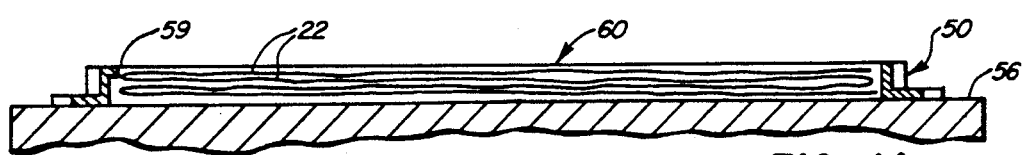
FIG. 14 is a horizontal sectional view taken laterally through the mold and the cast transom in the plane of the line 14—14 in FIG. 10 showing the fiberglas roving reinforcement therein.

The next step in the method is to fill the space between the outer skin of the transom and the removable bulkhead with a body 20 of synthetic resin, which may be polyester or some other moldable resin. Filler such as microspheres may be added to reduce weight without sacrificing strength. As an incident to the filling operation, internal reinforcing strands of synthetic resin fibers having high tensile strength, such as fiberglas tape 21, or fiberglas roving 22, are deployed generally horizontally in layers running from side edge to side edge of the transom (FIG. 3). This process continues until the space between the outer skin of the transom and the removable bulkhead has been filled with the body 20 of reinforced synthetic resin. At that point, the temporary bulkhead is removed and the exposed front face 24 of the transom body is covered with fiberglas reinforced resin skin 25 which is also adhesively connected to the outer skin side and bottom walls of the boat while still in the hull mold. The top of the transom is then finished off with this same material.

In accordance with another aspect of the invention, a modified method of fabricating the transom is defined (FIGS. 4A, 4B). The fiberglas outer skin 11 of the boat is built up in the hull mold as previously described. A relatively heavy fiberglas bulkhead 26 is then erected, being spaced from the outer skin of the transom by the thickness of the plastic transom body to be constructed. In the cavity between the fiberglas bulkhead and the fiberglas outer skin 11 of the transom. The bulkhead 26 itself is rigidly connected to the outer skin of the sides and bottom of the boat, as by means of suitable adhesive and fiberglas fillets, while still in the hull mold.

With the fiberglas bulkhead 26 in place, the transom body is then constructed by injecting the necessary synthetic resin material along with reinforcing such as fiberglas tape or roving. This material is laid down in reinforced layers running from side edge to side edge of the transom until the cavity between the bulkhead and outer skin of the transom has been filled. The next step includes finishing the top edge of the transom with a fiberglas resin skin.

To provide additional stiffness in the transom 10, the latter may be reinforced by appropriate gussets 42 (FIGS. 5 and 6). In this instance a relatively heavy temporary bulkhead 28 is utilized and set in position forwardly of the fiberglas outer skin 15 of the transom by an amount equal to the thickness of the transom body about to be cast. The bulkhead 28 includes a pair of hollow triangular gusset forms or knees 29 communicating with the transom body cavity. The hollow on the inside of each gusset form 29 is filled in when the transom body material is inserted into the gap between the outer skin of the transom and the bulkhead 28 spaced inwardly from the transom. The gusset material is integral with the transom body 20 and binds readily to the outer fiberglas skin 11 on the bottom of the boat.

The completed transom is a laminated structure comprising a core or body 20 of fiberglas reinforced synthetic resin. The body is securely bonded to a reinforcing laminate which on the outer face is the outer skin 15 of the transom and on the inner face is a fiberglas resin bulkhead bonded to the transom body 20 and to the side and bottom walls of the hull. This laminate sandwich construction imparts a high degree of stiffening to the transom body, resulting in a transom having exceptionally great strength and the ability to absorb a severe impact without damage. It is less expensive than a conventional marine plywood transom and may readily be incorporated into a fiberglas plastic hull. It may also be utilized to replace an existing plywood transom which has started to deteriorate.

In further accordance with the invention, apparatus 30 has been provided for reinforcing and injecting the material for the transom body 20 into the body cavity 23 (FIGS. 1, 5, 7-9). The apparatus 30 in this instance comprises a relatively large injection gun 31 having a barrel 32 of appropriate length and diameter to fit easily into the transom body cavity 23. The upper end of the barrel 32 is connected to a collecting chamber 34 for the filling material which ultimately becomes the transom body 20. While it is conceivable that the injection gun 31 could be held and operated manually, it would be preferable to utilize a power assisted suspension for manipulating the gun during construction of the transom.

The collecting chamber 34 is supplied with material from several sources in close proximity to the injection gun 31 (FIGS. 1, 5, 7-9). One such material, as previously indicated, is polyester or other synthetic resin including microsphere filler to reduce weight. This material is supplied from a source 35 via a relatively large diameter flexible conduit 36. The latter is connected to a control valve 38 on a manifold 37 fixed to the collecting chamber 34. A catalyst or hardener is injected into the manifold 37 via a smaller diameter conduit 39 and control valve 40. A mixing device 41 in the manifold 37 blends the catalyst with the synthetic resin and the blended resin is then passed into the collecting chamber.

Two types of fiberglas reinforcement can be supplied to the collecting chamber 34 for inclusion in the plastic resin which forms the transom body 20. The first type is fiberglas tape 21, illustrated in FIGS. 7 and 8. The tape 21 is drawn from a main supply spool 44 (FIGS. 1, 5), led over a small guide roller 45, and thence downward into the collecting chamber 34. A continuous length of the tape 21 is pulled down into the blended resin passing through the collecting chamber and the injection gun barrel 32. This is accomplished by means of air jets from one or more jet nozzles 46 in the collecting chamber. The nozzles 46 are fed by high pressure air line 48 operated by control valve 49. The air jets can be pulsating as required.

The second type of fiberglas reinforcement in the transom is in the form of separate strands 22 called fiberglas roving (FIG. 9). This material is handled in much the same way as the tape. The roving comes from a main supply spool like the spool 44, thence over the small diameter guide roller 45, and downward into the collecting chamber 34. The air jets from the nozzles 46 draw a continuous length of roving down into the blended resin passing through the collecting chamber and into the barrel 32 of the injection gun.

In usage, the gun 31 is preferably machine operated so as to traverse the transom cavity in a direction laterally of the hull and thereby lay down the necessary courses of reinforced synthetic resin which ultimately define the transom core or body 20 (FIGS. 3, 7, 9). The gun barrel 32 has an appropriate diameter to fit easily within the gap between the outer skin 15 and the temporary bulkhead 16, 26 or 28 of the transom. It lays down successive courses of synthetic resin and entrained reinforcing material to completely fill the gap between the outer skin and the bulkhead. When the transom body cavity has been filled, the temporary bulkhead removed, and fiberglas skin applied to the front face of the transom the skin may be extended to cover the top of the transom if desired.

In accordance with a further aspect of the invention, provision is made for casting a reinforced synthetic resin transom separately from the hull mold. Referring more specifically to FIGS. 10-14, a generally horizontal open faced mold 50 is provided. The mold is made in sections 51, 52, 53, 54 and 55, all of generally L-shaped cross section. The mold sections are detachably connected to each other and to an underlying table or other horizontal supporting surface 56. The detachable connections 58 may be of any conventional, quick acting type. The common upstanding inner surface 59 of the mold sections defines the perimeter of the transom to be cast.

To construct a transom body 60 in the mold 50, an injection gun 31 similar to the ones described earlier herein is used. The gun 31 is held upright over the mold and reciprocated back and forth to lay down a body of reinforced plastic material. The reinforcement may be fiberglas tape 21 or roving 22, described earlier herein, or other reinforcing strands of high tensile strength synthetic resin. Such reinforcement is injected into the mold along with the plastic body material. The mold is filled to its top face and then smoothed off. After the plastic has set, the mold sections may be released and the transom body removed from the mold. It may then be installed in a boat hull in the conventional manner.

The applicant has developed a new and unique method of manufacturing boat transoms which not only reduces costs significantly but also adds substantially to the strength of the finished product. It has been known to reinforce polyester resin transoms with fiberglas tape or roving as noted earlier herein. Applicant has, however, discovered a novel way to increase substantially the strength of the transom while greatly reducing its cost. A transom made by this process will not warp, delaminate or rot and has far superior impact and compression strength in comparison to plywood.

Applicant's novel method comprises using the basic polyester resin transom mix and adding ground fiberglas reinforced plastic material such as trimmings, cutouts, overspray, and still residue after the solvent has been drawn off. This material, normally considered scrap, may be coarse ground, or may be broken up in a hammer mill, in such a way that the majority of the fiberglas fibers are left intact. This contributes greatly to the strength of the final product. The polyester resin also contains numerous microspheres which not only serve to reduce the weight of the mix but also hold the dispersed fibers and ground particles in suspension. It has been found effective to use as much as 50% scrap in the transom body mix. This mix permits the transom material to be pre-constructed and placed in a hull as is done with plywood, or it can be cast directly in place using an injection gun.

For casting the transom body using the mix just described, two types of supply unit may be utilized. The first type comprises a polyester resin supply unit 65 which injects synthetic resin via a flexible conduit 66 into a scrap mixing unit 68 (FIG. 15). The latter includes a coarse grinder 69 which breaks up the scrap S while preserving most of the entrained fibers. The coarse grinder 69 mixes the resin and microspheres with the coarse ground scrap and conducts the mix via flexible conduit 70 to the casting gun 71. The gun 71 which may be manually or power actuated, then casts the transom body 72 in an appropriate mold. This may be either the transom body cavity 74 at the stern of the boat 75, or the separate transom body mold 76 shown in FIGS. 17-20.

The second type of supply unit 78 is a single entity which accepts both the polyester resin and the broken scrap S. The unit 78 mixes together the three ingredients, resin, scrap and microspheres, and conducts the resulting mix via a flexible conduit 79 to the casting gun 71. The latter may also be power or manually actuated and is adapted to cast the transom body in the transom cavity of the boat, or in the separate transom body mold shown in FIGS. 17-20.

Turning now to FIG. 21, there is shown an enlarged, fragmentary, horizontal sectioned view taken through a finished transom body 80 and made in accordance with the novel method described in the six preceding paragraphs. This particular transom body happens to be approximately $1\frac{7}{8}$ inches thick. It has an exposed outer surface faced with a fiberglas layer 81 approximately 3/16 to $\frac{1}{4}$ inch thick and an exposed inner surface faced with a fiberglas layer 82 approximately $\frac{1}{8}$ inch thick. The core 84 of the transom, comprising in this instance approximately 43% reground scrap, is slightly over $1\frac{1}{2}$ inches thick. The substantially even distribution of the reinforcing fibers 85 is readily apparent upon inspection of the sample. A transom constructed in this manner is capable of withstanding impacts many times greater than one made of plywood and has far greater longevity.

What is claimed is:

1. A method for constructing a boat transom including a transom body and comprising the following steps:
   (a) providing a pair of forms spaced apart to define a gap equal to the thickness of the transom body;
   (b) providing a peripheral wall sealingly connecting said forms along their side edges and bottom edges but leaving the top open;
   (c) casting a medium consisting of synthetic resin with entrained fiberglass reinforcing strands and microspheres into said gap until the latter has been filled; and (d) removing said forms from said transom body casting.

2. A boat transom cast in place between a pair of spaced apart forms defining a transom body cavity, said transom comprising, in combination:
 (a) a transom body composed of synthetic resin blended with a suitable hardener;
 (b) said body having a pair of opposed side edges and a bottom edge therebetween; and
 (c) a plurality of entrained reinforcing strands of high tensile strength synthetic resin and microspheres deployed in generally horizontal, zig zag fashion between said edges throughout said transom body.

3. A reinforced boat transom adapted to be formed in the opening between the fiberglass outer skin of the transom and a removable bulkhead spaced forwardly therefrom, said transom comprising the combination of:
 (a) a body of synthetic resin formed in said opening;
 (b) a plurality of continuous fiberglass strands entrained in said resin body;
 (c) said continuous fiberglass strands being deployed in successive courses running in zig zag fashion between the edges of said body; and
 (d) ground fiberglass reinforced plastic scrap and a plurality of microspheres evenly dispersed throughout said body.

4. A method for constructing a boat transom comprising the steps of:
 (a) providing a generally horizontal supporting surface;
 (b) providing a peripheral mold attached to said horizontal supporting surface;
 (c) casting a transom body of synthetic resin with entrained reinforcing strands and microspheres into said mold until the latter has been filled;
 (d) smoothing the exposed upper face of said transom body; and
 (e) removing said transom body from said mold.

5. The method set forth in claim 4, wherein said reinforcing strands are laid in a skewed pattern within said transom body.

6. The method set forth in claim 4, wherein said transom body upon removal from said mold is then adhesively secured in a boat hull and faced with fiberglass skin.

7. A method of fabricating a boat transom comprising the steps of:
 (a) providing a first support for fiberglass cloth or the like to define the outer skin of the hull including the transom;
 (b) setting a temporary bulkhead in forwardly spaced relation with said outer skin of said transom defining an opening at the top of the space therebetween;
 (c) providing sealing means between the temporary bulkhead and the sides and bottom portions of the outer skin of the hull;
 (d) injecting a transom mix comprising a polyester resin, ground fiberglass reinforced plastic scrap, and a plurality of microspheres to fill said opening between said outer skin of said transom and said temporary bulkhead; and
 (e) removing said temporary bulkhead and covering the front face of said transom with a fiberglass outer skin bonded thereto and to the sides and bottom of said outer skin of said hull.

8. A method for constructing a boat transom including a transom body and comprising the following steps:
 (a) providing a pair of forms spaced apart to define a gap equal to the thickness of the transom body;
 (b) providing a peripheral wall sealingly connecting said forms along their side edges and bottom edges but leaving the top open;
 (c) casting a medium consisting of a synthetic resin, ground fiberglass reinforced plastic scrap, and a plurality of microspheres into said gap until the latter has been filled; and
 (d) removing said forms from said transom body casting.

9. A reinforced boat transom adapted to be formed in the opening between the fiberglass outer skin of the transom and a removable bulkhead spaced forwardly therefrom, said transom comprising the combination of:
 (a) a body of synthetic resin formed in said opening;
 (b) said resin body containing ground fiberglass reinforced plastic scrap dispersed uniformly throughout said resin; and
 (c) a plurality of microspheres dispersed uniformly throughout said resin and said plastic scrap.

10. A reinforced boat transom as described in claim 9, wherein said body contains approximately 50% ground fiberglass reinforced plastic scrap.

11. A method for constructing a boat transom comprising the steps of:
 (a) providing a generally horizontal supporting surface;
 (b) providing a peripheral mold attached to said horizontal supporting surface;
 (c) casting a medium consisting of a synthetic resin, ground fiberglass reinforced plastic scrap, and a plurality of microspheres into said gap until the latter has been filled; and
 (d) removing said transom body casting from said mold.

12. The method for constructing the boat transom as set forth in claim 11, wherein said medium comprises approximately 50 percent fiberglass reinforced plastic scrap.

* * * * *